United States Patent
Johnson et al.

[11] 3,815,046
[45] June 4, 1974

[54] SYNCHRONOUSLY DRIVEN Q-SWITCHED OR Q-SWITCHED-MODE-LOCKED LASER OSCILLATOR

[75] Inventors: Bertram C. Johnson, Palo Alto; Lloyd L. Steinmetz, Livermore, both of Calif.

[73] Assignee: The United States of America as represented by the United States Atomic Energy Commission, Washington, D.C.

[22] Filed: Feb. 7, 1973

[21] Appl. No.: 330,523

[52] U.S. Cl. ............................................. 331/94.5
[51] Int. Cl. ................................................ H01s 3/11
[58] Field of Search .................................... 331/94.5

[56] References Cited
UNITED STATES PATENTS
3,521,069   7/1970   DeMaria et al. ................... 331/94.5
3,571,744   3/1971   Hook et al. ........................ 331/94.5

Primary Examiner—William L. Sikes
Attorney, Agent, or Firm—John A. Horan; F. A. Robertson; L. E. Carnahan

[57] ABSTRACT

A laser oscillator for producing relatively long duration Q-switched or Q-switched/mode-locked bandwidth-limited pulses. The oscillator is self-driven and then synchronously gated at the cavity round trip time, whereby a large pulse of noise light of controllable duration is allowed to build-up by means of controlled bandwidth feedback. The oscillator is an improvement over that described and claimed in copending U. S. Pat. application Ser. No. 226,471, filed Feb. 15, 1972, now U.S. Patent No. 3,757,249, and assigned to the same assignee. A factor of ten or more improvement in energy per pulse has been achieved while preserving both the desired bandwidth limited character of the pulses and the range of realizable pulse-widths provided by the oscillator of the above-mentioned application.

5 Claims, 4 Drawing Figures

SYNCHRONOUSLY DRIVEN Q-SWITCHED OR Q-SWITCHED-MODE-LOCKED LASER OSCILLATOR

BACKGROUND OF THE INVENTION

The invention described herein was made in the course of, or under, Contract No. W-7405-ENG-48 with the United States Atomic Energy Commission.

This invention relates to laser oscillators, particularly to Q-switched or Q-switched/mode-locked laser oscillators for directly producing bandwidth-limited pulses, and more particularly to such oscillators which are self-driven and then synchronously gated at the cavity round trip time.

Bandwidth-limited laser pulses, due to their lack of frequency or amplitude modulation, are highly desirable for many applications in the field of laser technology, such as for diagnostics, communication, amplification, experimentation, and many other applications of light pulses. Copending U. S. Pat. application Ser. No. 226,471 now U.S. Patent No. 3,757,249 provides a laser oscillator for producing the desired relatively long duration Q-switched or Q-switched/mode-locked bandwidth-limited pulses, wherein a large pulse of optical noise of controllable duration is allowed to buildup by means of controlled bandwidth feedback in an optical cavity.

SUMMARY OF THE INVENTION

The present invention is an improved laser oscillator over that described and claimed in the above-referenced copending application wherein it is synchronously gated at the cavity round trip time. A factor of ten or more improvement in energy per pulse has been achieved while preserving both the desirable bandwidth limited character of the pulses and the range of realizable pulsewidths of the laser oscillator of said copending application, namely, between 0.25 nsec to > 100 nsec. The improved energy output, basically, is accomplished by applying an alternating voltage to the Pockel cell.

Therefore, it is an object of this invention to provide a laser oscillator.

A further object of the invention is to provide a laser oscillator capable of producing bandwidth-limited pulses.

Another object of the invention is to provide a laser oscillator which is self-driven and then synchronously gated at the cavity round trip time.

Another object of the invention is to provide a laser oscillator for producing relatively long duration Q-switched or Q-switched/mode-locked bandwidth-limited pulses, and which is self-driven and synchronously gated.

Other objects of the invention, not specifically set forth above, will become readily apparent from the following description and accompanying drawings.

DESCRIPTION OF THE INVENTION

Figure 1:
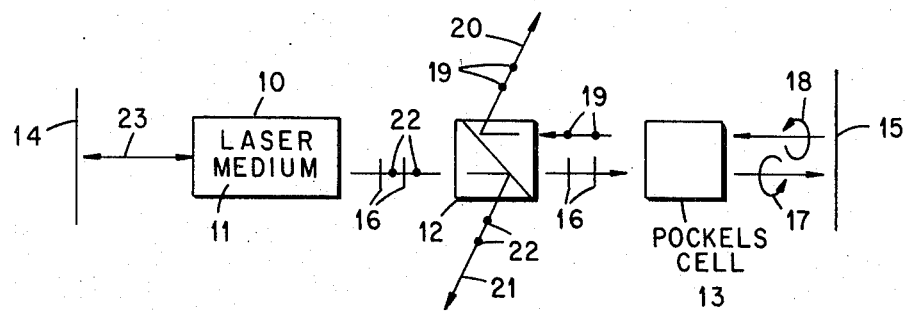
FIG. 1 is a schematic illustration of an embodiment of the inventive laser oscillator in the Q-spoiled condition.

This invention constitutes an improvement over the laser oscillator described and claimed in the above-referenced copending U. S. application Ser. No. 226,471. The oscillator of the present invention is similarly driven to initiate a pulse of light, but then is synchronously gated to allow perferential oscillation of the pulse thus initiated. A factor of ten or more improvement in energy per pulse has been achieved by utilizing the improvement while preserving both the desirable bandwidth limited character of the pulses and the range of realizable pulsewidths provided by the laser oscillator of said copending application.

Prior to describing the invention, the following general description of the oscillator of the above-referenced application is set forth to provide a clearer understanding of the improvements provided by the present invention.

Like the present invention, the referenced laser oscillator is capable of directly producing Q-switched or Q-switched/mode-locked bandwidth-limited pulses with durations ranging between about 0.25 nsec to greater than 100 nsec. The oscillator operates as a self-driven optical resonator, whereby spontaneous emission noise in the cavity is gated, symmetrically in time to a high Q state in the system and then allowed to buildup by means of controlled bandwidths feedback.

The principle elements of the above-referenced oscillator are a gain or lasing medium such as Nd-YAG, a polarizer, a quarterwave plate, and a Pockel cell; all placed within an optical cavity defined by two multiple-face resonant-reflecting etalons. The polarizer, quarterwave plate, and Pockel cell (hereinafter referred to as the PQP) are situated between the gain medium and the highly reflecting rear etalon. The PQP elements are arranged such that the cavity is in low Q (lossy) configuration when the Pockel cell is biased at either of its halfwave or its zero retardation voltage. With the Pockel cell biased initially at its halfwave value, the optical cavity is switched by shorting the bias voltage to ground while the gain medium is at its maximum inversion. As the Pockel cell retardation passes through its quarterwave value, the transmission of the PQP reaches a maximum and a noise pulse (spontaneous emission light) is allowed to pass through the rear of the cavity with minimal attenuation. Since the Pockel cell voltage is switched to zero in a few nanoseconds or less, and since the transmission characteristic of the PQP-etalon combination is symmetric in time, a large amplitude noise pulse whose spatial extent is less than the cavity length and whose envelope is symmetric about its intensity maximum is initiated in the cavity. The initial noise pulse is then permitted to oscillate by maintaining a cavity round trip gain for the gated pulse which is greater than unity when the cavity is in its residual low Q state (i.e., Pockel cell bias voltage at zero). The frequency content of the oscillating pulse is constrained by the narrowband feedback properties of the resonantly reflecting etalons, which will allow oscillation for either a single axial mode or a few of the possible axial modes of the cavity. The operation of the oscillator relies on the combination of the fast, time symmetrical PQP switch and the narrowband frequency selecting elements in the cavity. This combination when incorporated with the control of inversion provides for independent determination of the time and frequency content of the pulse, hence making it possible to achieve bandwidth-limited pulses in this sytem over a narrow range of pulse durations.

As pointed out above, bandwidth-limited laser pulses, due to their lack of frequency or amplitude modulation, are desirable in all fields of laser technology. A bandwidth-limited laser pulse may be generally defined as a light pulse having a bandwidth to the inverse of its time duration. Mathematically, a bandwidth-limited pulse occurs when the Fourier transform of the pulse intensity as a function of time I (t) is identical in form to its intensity as a function of frequency, I (w), i.e.:

$$I(w) \int_{-\infty}^{\infty} e^{iwt} I(t) dt$$

The above relationship implies that bandwidth-limited laser pulses are neither frequency-modulated nor amplitude-modulated. Such bandwidth limited pulses are ideal for diagnostics, communication, amplification, experimentation, and many other applications of light pulses.

The inventive improvement over the above-referenced copending laser oscillator provides such an oscillator which is self-driven and then synchronously gated at the cavity round trip time. Broadly, this is accomplished by applying an alternating voltage to the Pockel cell, as described hereinafter with respect to FIGS. 1 and 2. In addition, the present invention is more structurally simple, in that the quarterwave retardation plate of the above-referenced system has been eliminated. As a result of the present invention, the pulse energy is about 10 times that of the laser oscillator of the above-referenced copending application.

Figure 2:
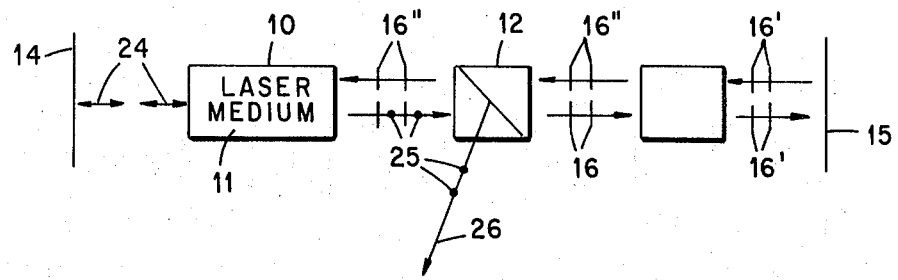
FIG. 2 schematically illustrates the FIG. 1 embodiment with the Pockel cell at zero voltage whereby oscillation can occur.

The embodiment of the inventive laser oscillator schematically illustrated in FIGS. 1 and 2 comprises a vessel 10, constructed of suitable material such as aluminum or stainless steel, within which is located a lasing or gain medium 11, such as ruby, neodymium; YAG, neodymium; glass, $CO_2$, or organic dye such as rhodamine 6G, vessel 10 being provided with means, not shown, for activating the medium 11, such as flashlamps, electron beams, etc., and appropriate transparent window means, not shown, through which the light pulses pass; a polarizing prism 12, constructed, for example, of calcite, a Pockel cell 13, each of elements 10–13 being placed within an optical cavity defined by reflective means comprising to multiple-face, resonantly reflecting etalons 14 and 15. For example, front etalon 14 may consist of 2, 4 or 6 faces (1, 2 or 3 plates) whereas rear etalon 15 may have eight faces (4 plates) in order to provide the desired frequency properties. Other types of reflective means and frequency selecting elements may be used, such as two single surface reflective means (mirrors) with the additional frequency selection being provided by other means internal to the cavity, or by a highly dispersive grating in place of rear etalon 15.

FIG. 1 shows the light travel and polarization state of the light transmitted by each element in the optical cavity with alternating voltage applied to Pockel cell 13 at its quarterwave voltage ($V = V_{\lambda/4}$), whereby the laser is in the Q-spoiled condition. As shown, light from the gain medium 11, transmitted by polarizing prism 12, is linearly polarized in the plane of the sheet of paper as indicated by lines 16. The Pockel cell 13 converts the linearly polarized light to circularly polarized light in a left circular (LC) direction, as indicated at 17. Reflection from rear etalon 15 converts the light to polarization in the right circular (RC) direction, as indicated at 18, which is converted back to linear polarization by Pockel cell 13, but perpendicular to the plane of the sheet of paper indicated by the dots 19, and the polarizing prism 12 reflects light out of the optical cavity, as indicated by arrow 20. While incident and reflected beams are colinear the incident beam, indicated by arrow 21 and having a polarization perpendicular to the plane of the sheet of paper as indicated by dots 22, has been illustrated separately in FIG. 1 for clarity. A portion of the linearly polarized light indicated at 23 passes through polarizing prism 12, through the gain medium 11, and is reflected back through the optical cavity by etalon 14 in an oscillatory mode.

FIG. 2 shows the light travel and polarization state of the light transmitted by each element in the optical cavity with the Pockell cell 13 at zero voltage, whereby laser oscillation occurs. As shown, light from the gain medium 11, transmitted by polarizing prism 12, is linearly polarized in the plane of the sheet of paper as indicated by lines 16 and passes through Pockel cell 13 without change in polarization and is reflected from rear etalon 15 still in linearly-polarized condition as indicated at 16', passing back through Pockel cell 13 and prism 12 in linearly polarized condition, as indicated at 16'', through lasing medium 11 and reflected by front etalon 14 back through the cavity as indicated at 24, thus oscillation of light 16 through the cavity. A portion of the linearly polarized light 16 perpendicular to the plane of the paper indicated by dots 25 is reflected out of the cavity by prism 12 as indicated by arrow 26.

A bandwidth-limited light pulse is obtained from the above-described laser oscillator in the following manner: (1) the Pockel cell 13 is electrically biased, by applying an alternating voltage thereto by means described hereinafter, at its quarterwave voltage, which for example may be ~ 5,000 volts, and the gain medium is optically pumped to create a population inversion in the lasing species; (2) the electrical potential across the Pockel cell 13 is switched through zero toward its negative quarterwave value, thereby rapidly dropping the voltage impressed across the cell. As the voltage across cell 13 drops to its "zero" retardation value, the laser cavity is in effect "turned on" wherein a pulse of light is allowed to pass back and forth through the rear of the cavity (elements 12, 13, 15, 13, 12) essentially unattenuated.

The improvements over the laser oscillator of the above-described copending application are as follows:

1. Increase of power output by as much as an order of magnitude or more while preserving both the desirable bandwidth-limited character of the pulses and the range of achievable pulsewidths. For example, the energy output is about 1 mj/pulse. This is made possible by eliminating the Pockel cell-polarizer loss at a synchronous rate for the initially gated pulse while maintaining a high loss for any competing noise pulses. The Pockel cell-polarizer loss is due to a transient elastooptic effect which is eliminated by a suitable bias voltage inherent in the alternating drive voltage. 2. Decrease by one-half the voltage insulation requirements for the Pockel cell, since the maximum voltage corresponds to $V_{\lambda/4}$ rather than $V_{\lambda/2}$.

Figure 3:
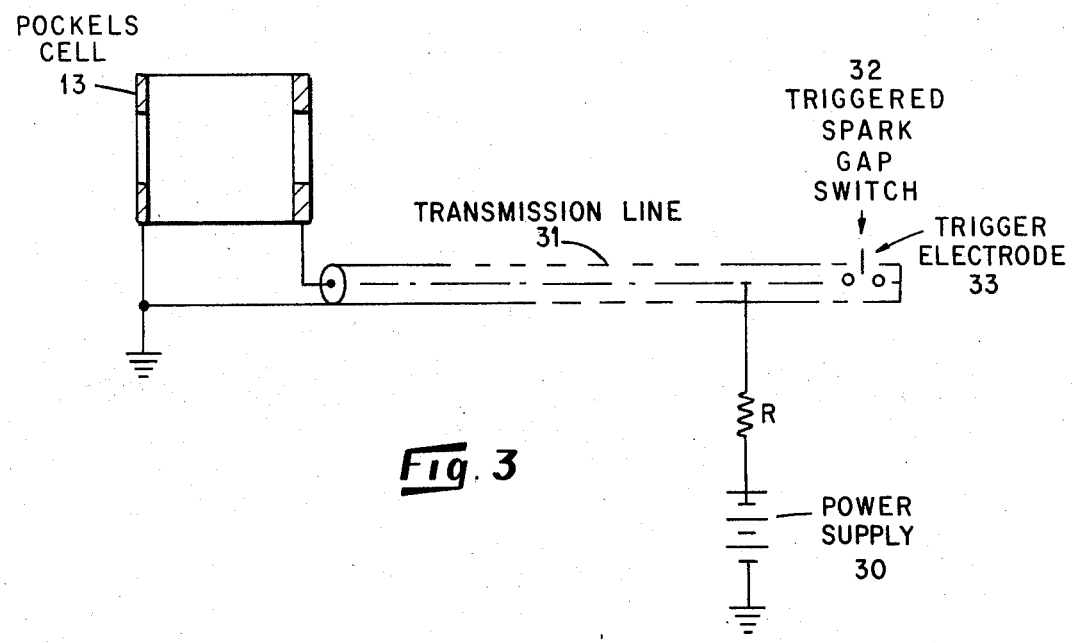
FIG. 3 schematically illustrates a transmission line-spark gap switch arrangement for applying alternating voltage to a Pockel cell of a laser oscillator in accordance with the invention.

One method of achieving short pulses in the oscillator of FIGS. 1 and 2 uses a switch to short circuit a charged transmission line connected to the Pockel cell as illustrated in FIG. 3. As shown, Pockel cell 13 is electrically connected to a power supply 30 via a transmission line 31 having a time delay t and a charging resistor R. The power supply 30 has a voltage $V_{\lambda/4}$, such as 5,000 volts. A spark gap switch generally indicated at 32 triggered by an auxiliary or trigger electrode 33 by an electrical signal or light flash is operatively connected to transmission line 31 and functions to short circuit the charged transmission line when activated to drop the voltage applied to Pockel cell 13 through zero at which point a pulse is initiated into the laser cavity. The voltage applied to the Pockel cell 13 alternates between $+V_{\lambda/4}$ and $-V_{\lambda/4}$ neglecting the circuit losses. The zero crossing points reoccur at a rate corresponding to the round trip time of the optical pulse in the laser cavity, thus providing a preferential "on" condition for the initial pulse at the expense of other intracavity noise. The losses damp the amplitude as shown in FIG. 4.

Figure 4:
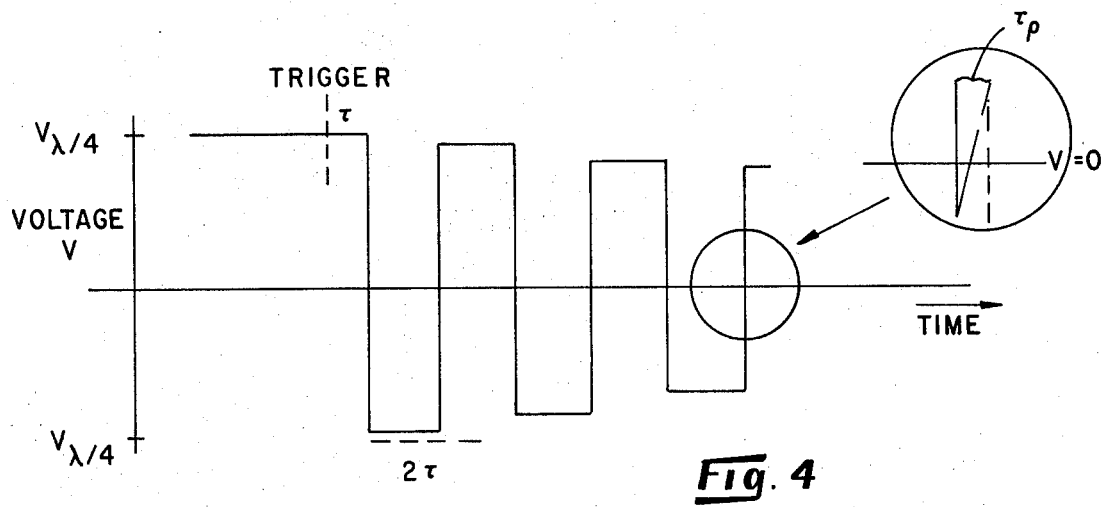
FIG. 4 graphically illustrates alternating voltage applied to a Pockel cell, showing an example of the lasing pulse duration.

FIG. 4 illustrates the alternating voltage V applied to Pockel cell 13. The small insert shows an example of the lasing pulse duration $\tau_p$. Thus, laser oscillation is provided during a small interval $\tau_p$, near the point where the alternating voltage signal passes through zero voltage.

It has thus been shown that the present invention provides a laser oscillator for producing relatively long duration Q-switched or Q-switched/mode-locked bandwidth-limited pulses, the oscillator being self-driven and then synchronously gated at the cavity round trip time, whereby a large pulse of noise light of controllable duration is allowed to buildup by means of controlled bandwidth feedback, producing a pulse energy about 10 times that of the oscillator of the above-referenced copending application.

While a particular embodiment of the invention has been illustrated and described, modifications will become apparent to those skilled in the art, and it is intended to cover in the appended claims all such modifications as come within the spirit and scope of the invention.

What we claim is:

1. A laser oscillator for producing relatively long duration Q-switched or Q-switched/mode-locked bandwidth-limited pulses comprising: an optical cavity defined by a pair of spaced reflective means, gain medium located within said optical cavity for producing a light pulse, polarizing means located within said cavity intermediate said gain medium and one of said reflective means for polarizing said light pulse produced from said gain medium, and Pockel cell means positioned within said cavity intermediate said polarizing means and said one of said reflective means; means for applying an alternating voltage across said Pockel cell means; and means for switching through zero the voltage applied across said Pockel cell means reducing same to approximately zero voltage thereacross at a repetitive rate, whereby a large amplitude light noise pulse is oscillated in said optical cavity as said applied voltage crosses zero at a repetitive rate.

2. The oscillator defined in claim 1, wherein said voltage applying means includes a transmission line means for providing an alternating voltage to said Pockel cell means, a power supply connected to said transmission line means, and voltage shorting means operatively connected to said transmission line means for selectively short circuiting said transmission line means.

3. The oscillator defined in claim 2, wherein said voltage shorting means includes a spark gap switch means operatively connected to said transmission line means, and triggering electrode means operatively connected to said spark gap switch means to trigger same upon an appropriate signal applied to said triggering electrode means.

4. The oscillator defined in claim 2, additionally including a resistor means positioned intermediate said power supply and said transmission line means.

5. The oscillator defined in claim 1, wherein said voltage shorting means comprises a triggered spark gas switch and means for triggering said switch.

* * * * *